Aug. 28, 1962  J. S. KAMBORIAN  3,050,756
METHOD OF APPLYING ADHESIVE IN SHOE MANUFACTURE
Filed May 11, 1960
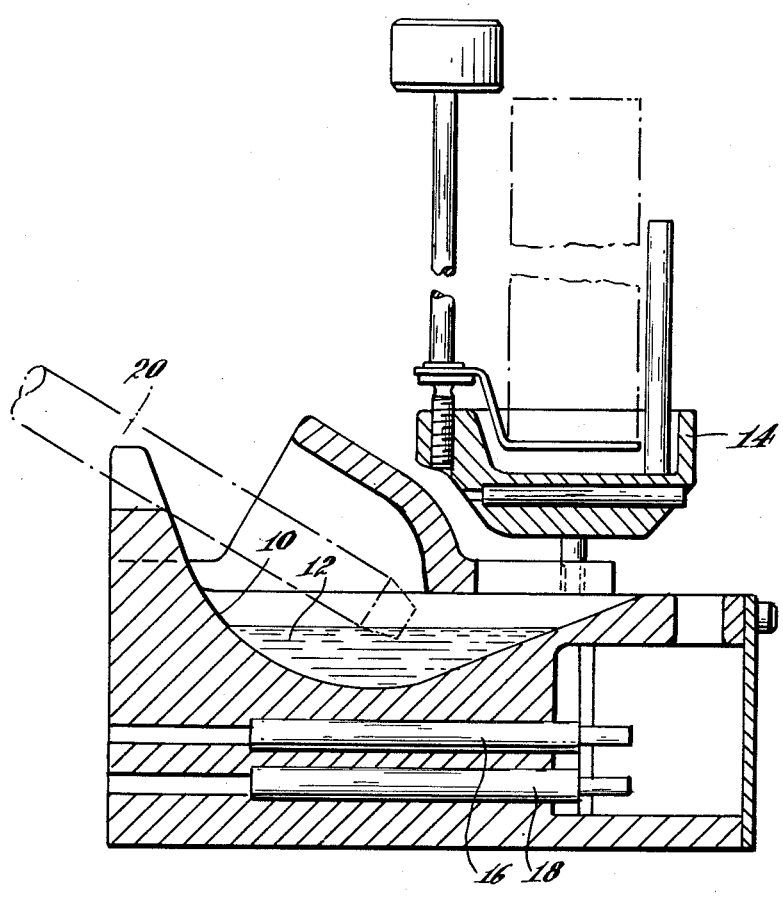
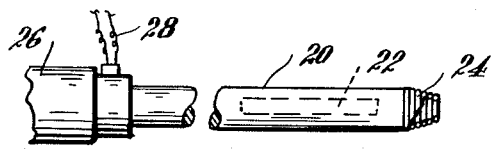
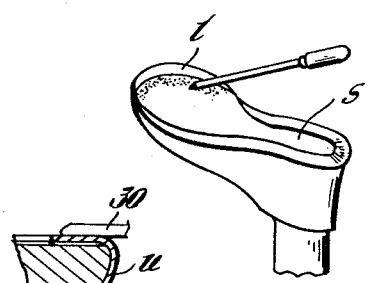
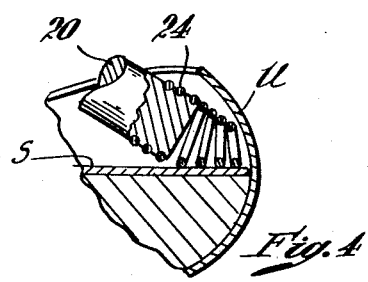
Inventor
Jacob S. Kamborian
by Roberts, Cushman & Grover
Attys United States Patent Office 3,050,756
Patented Aug. 28, 1962

3,050,756
METHOD OF APPLYING ADHESIVE IN
SHOE MANUFACTURE
Jacob S. Kamborian, 133 Forest Ave.,
West Newton, Mass.
Filed May 11, 1960, Ser. No. 28,408
1 Claim. (Cl. 12—145)

This invention relates to a method of cement lasting shoes and more especially to a method of applying a quick-setting cement, hereinafter referred to as adhesive, to the margin of the insole and/or the upper of a shoe in a manner to improve bonding of the parts.

The principal objects are to provide a method for transferring a quantity of the molten adhesive from a source of molten adhesive to the work without substantial cooling of the adhesive during each transference; of maintaining the adhesive molten during transfer and application to the insole and/or the upper; and of instantly lasting the margin of the upper inwardly over the insole to cause it to adhere thereto.

The foregoing is accomplished herein by removing with a heated implement a quantity of molten adhesive from a container in which it is kept molten, applying the adhesive to the margin of the shoe upper and/or insole, supplying sufficient heat to the implement to maintain the adhesive molten during the transference and application, and quickly wiping the upper margin over the insole after the application to cause the parts to be securely bonded.

The method will now be described in greater detail with reference to the accompanying drawings wherein:

FIG. 1 is a vertical section of a container for holding a body of molten adhesive;

FIG. 2 is an elevation of an applicator or pick by means of which molten adhesive may be transferred from the container to the work;

FIG. 3 is a perspective view of an upper assembled on a last preparatory to lasting, showing the use of the pick for spreading adhesive on the margin of the insole and/or the upper;

FIG. 4 is a greatly enlarged fragmentary view of the tip of the pick bent by engagement with the work to increase the discharge; and FIG. 5 is a greatly enlarged fragmentary view of the wiper wiping in the lasting margin of the upper over the insole of the shoe.

Most thermoplastic resins heretofore used as adhesives in the lasting of shoes have a relatively large range between the temperature in which the adhesive is in the liquid state and the temperature in which the adhesive is in the solid state. Hence it is necessary to hold the bottom of the shoe against the wipers for an appreciable period of time following the lasting operation to insure setting before the pressure is removed. This, of course, slows down production materially and is particularly objectionable to piece workers. Accordingly, resort has been made to quick-setting adhesives having a narrow solidification range. For example, polymers having a controlled degree of crystallinity, wherein the difference in temperature between the liquid state and the solid state is a relatively small one so that a slight cooling of the liquid adhesive will cause it to solidify.

The principal difficulty in applying such quick-setting adhesive is that the adhesive commences to solidify before it can be effectively applied to the work, that is, during the period of transfer from the container in which it is kept molten to the work and while rubbing it on the work. Brushes and pressure nozzles which have been and are used extensively for applying adhesive have not proved entirely satisfactory because the adhesive cannot be kept molten right up to the point of application and while it is being worked onto the surfaces to be bonded. Spray guns are ineffective because the atomization itself cools the adhesive.

The foregoing difficulties may be largely obviated according to the method herein illustrated, by using a heated pick for removing a quantity of molten adhesive from a container in which the adhesive is kept molten, keeping the adhesive molten throughout transfer and during application to the work by supplying heat to the applicator, and after applying the molten adhesive with the pick immediately lasting the margin inwardly against the insole.

The foregoing method may be accomplished according to this invention with the adhesive melting container shown in pending application Serial No. 20,460, filed April 6, 1960 and the heated applicator or pick shown in pending application Serial No. 20,461, filed April 6, 1960.

The container, as shown in the first-mentioned application, has a shallow bowl 10 to which molten adhesive 12 is supplied in a continuous fashion from a melting pot 14 and in which it is maintained liquid by heating elements 16 and 18. Molten adhesive is removed from the bowl 10 by a pick 20, such as shown in the second-mentioned application, the pick having a yieldable tip 24 of gradually decreasing diameter which is kept hot by means of a heating element 22 disposed within the stem in heat-conductive relation therewith. The tip is comprised of a coil of small diameter steel wire open at its end. Both the outer surface of the coil and its hollow interior are adapted to hold a body of melted adhesive substantially without drip. The convolutions of the coil are yieldably flexible and when pressure is brought to bear will open up more or less so as to deliver adhesive from within the coil onto the work as shown in FIG. 4.

The pick has a handle 26 by means of which it may be thrust into the bowl 12, as shown in FIG. 1, to pick up a finite quantity of liquid adhesive, then withdrawn from the container and transferred to the work, as shown in FIG. 3, where it is applied to the margin of the insole s and/or the lasting margin l of the upper u. During transfer the adhesive carried by the exterior and interior of the tip is kept hot by continually supplying heat to the tip from the heating element 22. The heating element is a resistance coil and suitable flexible conductors 28 extending from it through the handle provide for supplying current to the coil. The heated pick keeps the adhesive molten not only during transfer from the container to the work, but also while rubbing the molten adhesive onto the surface to which it is to be supplied so that heat dissipation due to the difference in temperature of work and adhesive does not cool the latter prematurely. By keeping the adhesive molten while it is being spread on the surfaces of the work it can be distributed much more effectively.

Immediately after the pick is removed from the work and prior to the setting or solidification of the adhesive the margin of the upper u is wiped inwardly over the top of the insole s by wiper means 30, as shown in FIG. 5, to force the opposing surfaces of the lasting margin and insole against each other. The wiper means may be of the form shown in Patent No. 2,888,693, granted to T. A. Weisz on June 2, 1959, to which reference may be had for a disclosure of how the wiper means is operated to be moved over the shoe.

The foregoing procedure is particularly effective because it prevents premature cooling and incipient setting of the adhesive due to the loss of heat prior to and during the spreading of the adhesive on the work parts to be bonded and yet insures rapid cooling at the last instant so that the margin when laid down will be bonded quickly without requiring an appreciable setting period.

While the above-described process is particularly advantageous in the lasting of shoes, it would have utility in making any article comprising two layers of parts of material whose surfaces are adhesively bonded by a quick-setting adhesive.

It should be understood that the present disclosure is for the purpose of illustration only and that this invention includes all modifications and equivalents which fall within the scope of the appended claim.

I claim:

The method of bonding the lasting margin to the insole of shoe using a quick-setting adhesive that is normally solid at ambient temperature, comprising the steps of dipping an applicator in a supply of molten adhesive to pick up a quantity of the adhesive, transferring the applicator with the adhesive thereon to the shoe, rubbing the applicator on at least one of the surfaces of the lasting margin and insole which are to be bonded, supplying heat to the applicator during the transference of the applicator and the rubbing of the applicator to maintain the adhesive molten, removing the applicator, and wiping the lasting margin in over the insole while the adhesive is still molten so as to cause the lasting margin to adhere to the insole.

References Cited in the file of this patent

UNITED STATES PATENTS

| 1,989,607 | Ray | Jan. 29, 1935 |
| 2,142,238 | Chapelle | Jan. 3, 1939 |
| 2,791,669 | Ferrara | May 7, 1957 |